(12) United States Patent
Kleen et al.

(10) Patent No.: US 10,789,490 B2
(45) Date of Patent: Sep. 29, 2020

(54) METHOD FOR CALCULATING A DISPLAY OF ADDITIONAL INFORMATION FOR AN ADVERTISEMENT, A DISPLAY UNIT, APPARATUS FOR CARRYING OUT THE METHOD, AND TRANSPORTATION VEHICLE AND COMPUTER PROGRAM

(71) Applicant: VOLKSWAGEN AKTIENGESELLSCHAFT, Wolfsburg (DE)

(72) Inventors: Andro Kleen, Braunschweig (DE); Anne-Marie Wesseling, Bodegraven (NL); Robert Jan Wyszka, Hannover (DE); Adrian Haar, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/355,736

(22) Filed: Mar. 16, 2019

(65) Prior Publication Data
US 2019/0294895 A1    Sep. 26, 2019

(30) Foreign Application Priority Data
Mar. 20, 2018 (DE) .......... 10 2018 204 254

(51) Int. Cl.
*G09G 5/00* (2006.01)
*G06K 9/00* (2006.01)
(Continued)

(52) U.S. Cl.
CPC .......... *G06K 9/00805* (2013.01); *B60K 35/00* (2013.01); *B60W 30/14* (2013.01);
(Continued)

(58) Field of Classification Search
None
See application file for complete search history.

(56) References Cited

U.S. PATENT DOCUMENTS

2015/0031448 A1* 1/2015 Sekol .................... A63F 13/803
463/31
2016/0052394 A1  2/2016 Yamada
(Continued)

FOREIGN PATENT DOCUMENTS

DE  102011007329 A1  10/2012
DE  102011082609 A1  3/2013
(Continued)

*Primary Examiner* — Anh-Tuan V Nguyen
(74) *Attorney, Agent, or Firm* — Barnes & Thornburg LLP

(57) ABSTRACT

A method for computing a display of additional information for display on a display unit. The insertion of additional information supports the driver in the longitudinal guidance of a transportation vehicle. The insertion of the additional information takes place as an augmented reality display, so that the additional information is computed contact-analogously to one or more objects in the environment of the transportation vehicle. The position of a transportation vehicle traveling in front is detected. When the observer transportation vehicle is approaching the transportation vehicle in front, an animated graphic is displayed section by section in a periodically recurring manner starting from the observer transportation vehicle.

16 Claims, 7 Drawing Sheets

(51) Int. Cl.
    *G01C 21/36*     (2006.01)
    *G02B 27/01*     (2006.01)
    *G06T 19/00*     (2011.01)
    *B60W 30/14*     (2006.01)
    *B60K 35/00*     (2006.01)

(52) U.S. Cl.
    CPC ....... *G01C 21/365* (2013.01); *G02B 27/0101* (2013.01); *G06K 9/00671* (2013.01); *G06T 19/006* (2013.01); *B60K 2370/1529* (2019.05); *B60K 2370/177* (2019.05); *B60K 2370/178* (2019.05); *B60K 2370/179* (2019.05); *B60K 2370/191* (2019.05); *B60K 2370/193* (2019.05); *B60K 2370/334* (2019.05)

(56) References Cited

U.S. PATENT DOCUMENTS

| | | | |
|---|---|---|---|
| 2016/0167514 A1* | 6/2016 | Nishizaki | B60K 35/00 345/7 |
| 2017/0084176 A1* | 3/2017 | Nakamura | G06T 7/70 |
| 2017/0160552 A1* | 6/2017 | Muramatsu | B60K 35/00 |
| 2017/0253181 A1* | 9/2017 | Choi | B60Q 9/008 |
| 2017/0287217 A1* | 10/2017 | Kim | H04N 7/18 |
| 2018/0023970 A1 | 1/2018 | Iguchi | |
| 2018/0024354 A1* | 1/2018 | Shibata | G08G 1/16 345/7 |
| 2018/0058879 A1* | 3/2018 | Tayama | B60W 30/16 |
| 2018/0061134 A1* | 3/2018 | Ota | G08G 1/166 |
| 2018/0240258 A1* | 8/2018 | Kosaka | B60K 35/00 |
| 2018/0306597 A1* | 10/2018 | Kosaka | B60K 35/00 |
| 2019/0005726 A1* | 1/2019 | Nakano | G08G 1/16 |
| 2019/0139298 A1* | 5/2019 | Cho | B60K 35/00 |

FOREIGN PATENT DOCUMENTS

| | | |
|---|---|---|
| DE | 102011112943 A1 | 3/2013 |
| DE | 102014113512 A1 | 3/2016 |
| DE | 102015214761 A1 | 2/2017 |
| EP | 2857247 A1 | 4/2015 |
| EP | 3031655 A1 | 6/2016 |
| EP | 3147149 A1 | 3/2017 |

\* cited by examiner

METHOD FOR CALCULATING A DISPLAY OF ADDITIONAL INFORMATION FOR AN ADVERTISEMENT, A DISPLAY UNIT, APPARATUS FOR CARRYING OUT THE METHOD, AND TRANSPORTATION VEHICLE AND COMPUTER PROGRAM

PRIORITY CLAIM

This patent application claims priority to German Patent Application No. 10 2018 204 254.3, filed 20 Mar. 2018, the disclosure of which is incorporated herein by reference in its entirety.

SUMMARY

The disclosure relates to the technical field of driver information systems, which are also known under the term infotainment system. Such systems are mainly used in transportation vehicles. However, it is also possible to use the disclosed embodiments for pedestrians, cyclists, etc. wearing data glasses. Illustrative embodiments relate to an appropriately designed device for carrying out the method, as well as to a transportation vehicle and a computer program.

BRIEF DESCRIPTION OF THE DRAWINGS

Exemplary embodiments are shown in the drawings and are explained in more detail in the following by reference to the figures, in which.

DETAILED DESCRIPTION

Figure 1:
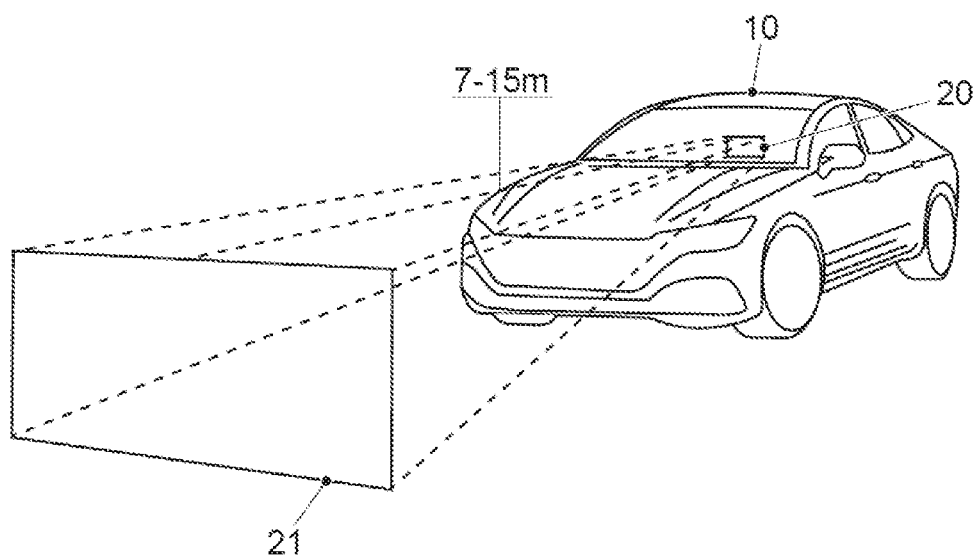
FIG. 1 shows the principle behind the display of information in the field of vision of the driver of a transportation vehicle when driving by a head-up display.

At present there is intensive work being carried out on technologies designed to later enable autonomous driving. A first approach to this is not intended to completely relieve the driver from his/her duties, but to ensure that the driver can take control of the transportation vehicle at any time. The driver also performs monitoring functions. Recent technologies in the field of driver information systems, such as Head-Up Displays (HUD) have made it possible to better inform the driver about what is happening in the environment around the transportation vehicle.

In the near future, it can therefore be assumed that on the system side, through the use of modern technologies (vehicle-to-vehicle communication, use of databases, transportation vehicle sensors, etc.), comprehensive information about objects (particularly, transportation vehicles) in the immediate surroundings of one's own transportation vehicle will be available. In the field of transportation vehicle sensors, the following components enable monitoring of the surroundings: RADAR equipment standing for Radio Detection and Ranging, LIDAR devices, standing for Light Detection And Ranging, mainly in the area of distance measurement/warning, and cameras with appropriate image processing for the field of object detection. These data relating to the environment can be used as the basis for system-side driving recommendations, warnings, etc. For example, this would allow indications/warnings to be shown about the direction (possibly in the transportation vehicle's own trajectory) in which another transportation vehicle in the vicinity might intend to turn.

The vehicle-to-vehicle communication is now also possible using mobile communication with systems such as LTE, corresponding to Long Term Evolution. This is the subject of a specification with the name LTE V2X agreed by the 3GPP organization. As an alternative, systems based on WLAN technology are available for the vehicle-direct communication, in particular, the WLAN p system.

The term "autonomous driving" is sometimes used in different ways in the literature.

To clarify this concept the following aside is therefore presented here. The term autonomous driving (sometimes also referred to as automatic driving, automated driving or piloted driving) is understood to mean the locomotion of transportation vehicles, mobile robots and driverless transport systems which behave largely autonomously. There are different gradations of the concept of autonomous driving. On certain levels the term autonomous driving is used when a driver is also present in the transportation vehicle, who is only responsible for monitoring the automatic driving operation. In Europe, the various ministries of transport (in Germany, the Federal Highway Research Institute was involved) collaborated and defined the following autonomy levels.

Level 0: "Driver only", the driver drives, steers, brakes, accelerates, etc. him/herself.

Level 1: Certain assistance systems give assistance during the transportation vehicle operation, including a Distance Control System—Automatic Cruise Control ACC).

Level 2: Partial automation. Functions such as automatic parking, lane keeping function, general longitudinal guidance, accelerating, braking, etc. are performed by the assistance systems (including traffic jam assistant).

Level 3: High automation. The driver does not need to continuously monitor the system. The transportation vehicle independently carries out functions such as the triggering of the indicator, lane changing and lane maintenance. The driver can attend to other things, but when necessary is prompted by the system to assume control within a pre-warning period. This form of autonomy is technically feasible on motorways. The legislator is working towards approval of Level 3 transportation vehicles. The legal framework for this has already been created.

Level 4: Full automation. The control of the transportation vehicle is performed by the system throughout. If the driving tasks are no longer manageable by the system, the driver may be prompted to take over control.

Level 5: There is no driver required. Apart from setting the destination and starting the system, no human intervention is required.

Automated driving functions from Level 3 and above relieve the driver of responsibility for control of the transportation vehicle.

Due to the current development towards higher levels of autonomy, but where many transportation vehicles are still controlled by the driver, it must be expected that appropriate additional information should already be usable in the medium term for manually guided transportation vehicles, rather than its use being deferred for use in highly automated systems in the long term. That being the case, the solution described in detail below can be used both for manually controlled as well as automatically controlled vehicles.

For the driver-vehicle interaction this raises the question of how this information can be displayed in such a way that genuine added value is obtained for the human driver, who is also able to locate the information provided quickly, or rather intuitively.

The following solutions in this area are already known from the prior art.

A vision of the future in the automotive industry is to use the windshield of the driver's own transportation vehicle to display virtual elements to provide certain benefits for the driver. The technology used is the so-called "Augmented Reality" technology (AR). Less commonly used is the corresponding German term which translates as "extended reality". In these technologies, the real environment is augmented with virtual elements. This has the benefit that the positionally faithful localization of the virtual elements in the real environment means that less cognitive effort is required on the part of the driver, since there is no need for interpretation of abstract graphical displays but rather an intuitive understanding can take place in line with normal perceptual habits. With regard to automatic driving, added value can also be generated.

Currently, Head-Up displays (HUD) are used in the transportation vehicles. These also have the benefit that the HUD image appears closer to the real environment. These displays are, in fact, projection units, which project an image onto the windshield. From the point of view of the driver, however, this picture is located from a few meters to 15 meters in front of the transportation vehicle, depending on the design of the module. This has the benefit that the inserted information is presented in such a way that the eyes of the driver are even relieved of the task of accommodation.

In AR-technology the "image" projected by the HUD is composed as follows: It is not so much a virtual display, as rather a kind of "key-hole" into the virtual world. The virtual environment is theoretically placed on top of the real world and contains the virtual objects that support and inform the driver when driving. A consequence of the limited display area of the HUD is that only an excerpt of it can be seen. In other words, the driver looks through the display area of the HUD at the excerpt of the virtual world. Since this virtual environment augments the real environment, it is also referred to in this case as a "mixed reality".

DE 10 2011 082 609 A1 discloses a method for highlighting a relevant point for a driver of a transportation vehicle. In the method, the position of a relevant point in an area in front of the transportation vehicle is determined. In one operation of the method this point is highlighted with a contact-analogous marking. In doing so, the style of presentation of the marking is chosen according to the distance between the transportation vehicle and the position of the relevant point.

Document EP 2 857 247 A1 discloses a device and a method for a transportation vehicle, which is designed for automatic longitudinal guidance. In the method the following operations are performed: detecting a guide transportation vehicle, wherein the guide transportation vehicle is a transportation vehicle traveling directly in front of the transportation vehicle. Determining a current state from at least two states, which describe a current response of the transportation vehicle to the guide transportation vehicle. Displaying the current state in animated form on a display such that it is distinguishable from other states.

Document DE 10 2011 112 943 A1 discloses a method for providing a driver assistance system with automatic longitudinal guidance for a transportation vehicle, in which the upcoming section of the route is visualized on a display surface, wherein at least one graphical object, which is assigned to a function of the automatic longitudinal guidance, is displayed in the visualized section of the route. The method for providing a driver assistance system with automatic longitudinal guidance is characterized in that, for the upcoming section of the route a video image sequence is recorded and played back in real time on the display surface, and the at least one graphical object is superimposed on the video image sequence. The superimposed display of a graphical object for the transportation vehicle longitudinal control with a video image sequence of the upcoming route section in real-time supports the driver in obtaining a full appraisal of the current driving situation.

DE 10 2011 121 763 A1 discloses a method for displaying distance information on a display device of a transportation vehicle. The method is characterized in that a live image of the driving lane ahead of the transportation vehicle is recorded with a camera, and a safe distance to the transportation vehicle in front is determined depending on at least one driving dynamic variable of the transportation vehicle. The live image is augmented by a virtual image component, such as a cross-beam, which indicates the safe distance to the transportation vehicle in front in a positionally faithful way.

A major benefit of the previously known "Augmented Reality" (AR) displays is the ability to present the corresponding displays directly within or as part of the environment. Relatively obvious examples mostly relate to the area of navigation. While classical navigation displays (in conventional HUDs) usually display schematic representations (for example, a right-angled arrow pointing to the right as a sign that the next right turn should be taken), AR-displays offer much more effective possibilities. Since the displays can be presented as "part of the environment", extremely fast and intuitive interpretations are possible for the user. However, the previously known approaches have various problems for which there are no known solutions at this time.

The known solutions are subject to various drawbacks. This has been recognized in the context of the disclosure.

The known solutions suffer from the problem that it is not conveyed clearly enough to the driver whether the longitudinal guidance system of the transportation vehicle is active and whether it has detected the transportation vehicle in front and is automatically performing the longitudinal guidance relative to the transportation vehicle in front.

There is therefore a need for further improvements in the longitudinal guidance of a transportation vehicle and in the relevant feedback to the driver via the infotainment system.

The disclosed embodiments provide such an approach.

The disclosed embodiments provide a method for computing a display of additional information for display on a display unit, in particular, a Head-Up Display (HUD) of a transportation vehicle or a pair of data glasses, a device for carrying out the method, a transportation vehicle, and a computer program. The insertion of additional information is intended to support the driver in the longitudinal guidance of the transportation vehicle.

The disclosed solution is based on the insertion of the additional information in the manner of "augmented reality" in a contact-analogous manner relative to a transportation vehicle in front. The position of the transportation vehicle traveling in front is also detected. The method is characterized in that when approaching the transportation vehicle in front, an animated graphic is computed such that starting from the observer transportation vehicle, the animated graphic is optionally displayed section by section in a periodically recurring manner. This makes the driver aware of the fact that a driver assistance function has detected a transportation vehicle in front and is initiating a control function in relation to the transportation vehicle in front.

In at least one exemplary embodiment of the disclosed method, during the first or a recurring display of the end of the animated graphic, an AR-display is computed such that at least one object recognition mark is placed at the end of the transportation vehicle in front in a contact-analogous manner to the transportation vehicle in front. This provides the driver of the transportation vehicle the information that the longitudinal guidance system is configured and has detected a transportation vehicle traveling in front and is now operating relative to this.

In this context, in an alternative design the AR-display is computed in such a way that two object recognition marks are placed, wherein an object recognition mark is computed in such a way that it highlights the end of the area on the ground behind the transportation vehicle and the other object recognition mark highlights the tailgate of the transportation vehicle in front. This approach is intended to allow the driver to understand the correct object perception, and create the necessary transparency required to build trust in the technical processes. This alternative design should exploit the benefit that the marking is not located in the vertical axis of the transportation vehicle, but more discreetly on the ground underneath. Secondly, this means that positioning errors are not so noticeable (if the object recognition mark is not exactly in the center of the transportation vehicle). In addition, the marking located on the ground can be more easily reached or manipulated by any animation of the animated graphic that is positioned on the ground. An example is the displacement of the object recognition mark.

To indicate an approach towards or movement away from the transportation vehicle in front a control activity mark is computed, which is computed in such a way that during an approach to the transportation vehicle in front it is displayed as an arrow pointing to the transportation vehicle in front between the observer transportation vehicle and the transportation vehicle in front, and during a movement away from the transportation vehicle in front the mark is displayed as an arrow pointing away from the transportation vehicle in front between the observer transportation vehicle and the transportation vehicle in front. This measure will provide information about the control activity of the driving function.

In a longitudinal guidance system for distance control or speed control the control activity mark is computed in such a way that during an approach to the transportation vehicle in front it moves towards the transportation vehicle in front, wherein on reaching the target distance or the target speed, the control activity mark is computed in such a way that it reaches the end of the animated graphic, at the position of the transportation vehicle traveling in front. The computation is then performed in such a way that the control activity mark is merged with the object recognition mark, wherein at least one side portion of the control activity mark attaches alongside the object recognition mark in a contact-analogous manner.

In an extension of the proposal the control activity is computed in such a way that it indicates the control activity of the longitudinal guidance system. Here at least three different states are distinguished, wherein an arrow oriented in the driving direction is formed if the target speed of the longitudinal guidance system is greater than the current speed of the observer transportation vehicle or the distance to the transportation vehicle in front is still greater than the target distance, wherein a reverse-directed arrow is formed if the target speed of the speed control system is lower than the current speed of the observer transportation vehicle, or the distance to the transportation vehicle in front is still less than the target distance, and wherein the side portions of the control activity mark are positioned in such a way that a line-like control locked-on mark is formed when the actual speed matches the target speed of the speed control system or the distance matches the target distance. This solution provides the driver with a variety of information with only one AR-display. The type of the control activity mark shows whether the driver's transportation vehicle is approaching or moving away from the transportation vehicle in front. The neutral phase is also conveyed, in which the transportation vehicle in front is being followed, as happens when driving in a convoy. This symbolism conveys to the driver that the transportation vehicle will maintain a constant distance from the transportation vehicle in front from now on. The positioning of the control activity mark between the transportation vehicle in front and the observer transportation vehicle provides information about the maintenance of the target distance.

In a disclosed embodiment, the animated graphic is computed as a grid.

The grid consists of a plurality of grid elements. The grid format provides, in addition to the fulfillment of the requirements, little masking of the environment and at the same time a sufficient level of fault tolerance, so that the human perception apparatus, based on evolutionary-biological assumptions, is capable of effortlessly understanding the individual display elements as a contiguous piece of information. It is relevant here to avoid unwanted masking effects, which can occur with AR-displays. This is achieved, on the one hand, by using the grid format and, on the other hand, by performing the computation such that the grid only extends as far as the transportation vehicle in front. In this way, the problem of "penetration" in AR displays is avoided. The term "penetration" refers to display cases in which an AR display is presented (e.g., a navigation path), but from the point of view of the user objects in front of the transportation vehicle appear to "pass through" it. These effects can occur when another transportation vehicle is traveling in front of the driven transportation vehicle, among other cases.

A device for implementing the method with an appropriately programmed computing unit attracts the same benefits as those mentioned for the corresponding method operations.

It is beneficial if the display unit of the device is embodied as a head-up display. Instead of a head-up display, a pair of data glasses or a monitor can be used as a display unit in the device, on which a camera image is displayed into which the animated graphic is inserted.

The disclosed device can be used in a motor transportation vehicle. In the transportation vehicle, the disclosed embodiments may be realized in such a way that the display unit is permanently installed in the transportation vehicle, for example, as a head-up display. However, another form of realization with the aid of a pair of data glasses is also possible if the use of the data glasses by drivers were to be allowed in the future. Its use on a mobile device such as a smartphone or tablet computer could also be feasible.

As mentioned above, the display unit may also correspond to a pair of data glasses. Then, the disclosed method could even be used by pedestrians, cyclists, motorcyclists, etc.

For a computer program which is executed in the computing unit of the device to carry out the disclosed method, the same benefits apply as those described in relation to the disclosed method.

The following description illustrates the principles of the disclosure. It goes without saying, therefore, that persons skilled in the art will be in a position to design different arrangements which, although not explicitly described here, nevertheless embody the principles of the disclosure and are also intended to fall within its scope of protection.

FIG. 1 illustrates the basic principle of operation of a head-up display. The head-up display 20 is mounted in the transportation vehicle 10 below/behind the instrument cluster in the dashboard area. By projection onto the windshield, additional information is displayed in the driver's field of view. These additional pieces of information appear as if they were projected onto a projection surface 21 at a distance of 7-15 meters in front of the transportation vehicle 10. The real world remains visible through this projection surface 21, however. Using the additional displayed information, a kind of virtual environment is created. The virtual environment is theoretically placed on top of the real world and contains the virtual objects that support and inform the driver when driving. But it is only projected onto a portion of the windshield, so that the additional information cannot be arbitrarily arranged in the field of vision of the driver.

Figure 2:
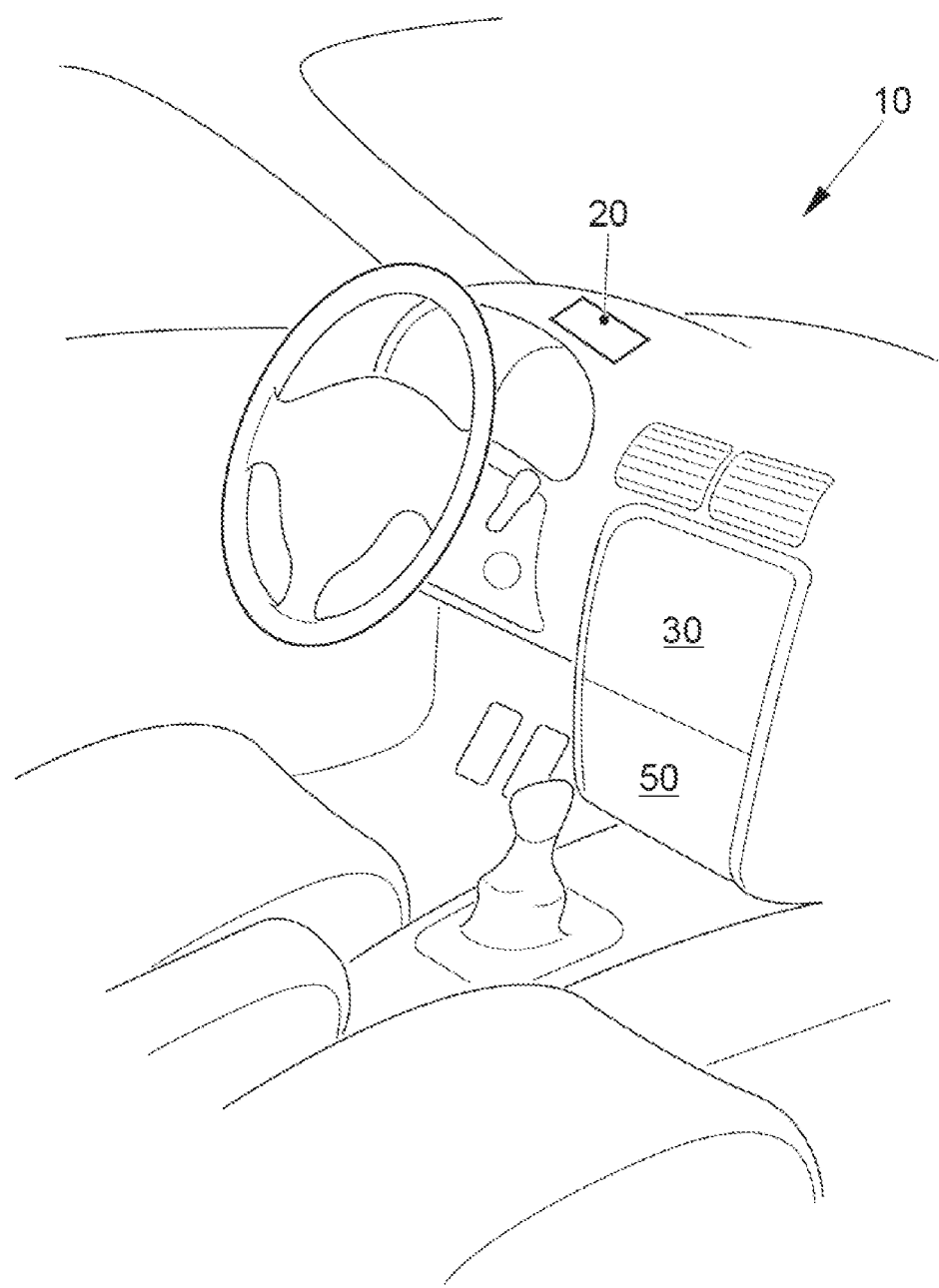
FIG. 2 shows the typical cockpit of a transportation vehicle.

FIG. 2 shows the cockpit of the transportation vehicle 10. The transportation vehicle shown here is a passenger car. Any other type of transportation vehicle could also be considered as the transportation vehicle 10, however. Examples of other transportation vehicles are: buses, commercial transportation vehicles, in particular, lorries, agricultural machinery, construction transportation vehicles, rail transportation vehicles etc. The use of the disclosure would be generally possible in land-based transportation vehicles, rail transportation vehicles, water-borne transportation vehicles and aircraft.

Three display units of an infotainment system are shown in the cockpit. These are the head-up display 20 and a touch-sensitive screen 30, which is mounted in the central console. When driving, the central console is not in the driver's field of vision. Therefore, the additional information is not overlaid on the display unit 30 when driving.

The touch-sensitive screen 30 is used to operate functions of the transportation vehicle 10. For example, it could be used to control a radio, a navigation system, a playback of stored music tracks and/or an air-conditioning system, or other electronic devices or other convenience functions or applications of the transportation vehicle 10. Collectively, this is often referred to as an "infotainment system". An infotainment system in transportation vehicles, in particular cars, designates the combination of a car radio, navigation system, speakerphone device, driver assistance systems and other functions in a central control unit. The term infotainment is a portmanteau word, composed of the words information and entertainment. The infotainment system is operated mainly using the touch-sensitive screen 30 ("touch screen"), wherein this screen 30 can be easily viewed and operated, in particular, by a driver of the transportation vehicle 10, but also by a passenger of the transportation vehicle 10. Below the screen 30, mechanical controls such as buttons, rotary knobs or combinations thereof, such as rotary pressure knobs, can also be arranged in an input unit 50. Typically, steering wheel operation of parts of the infotainment system is also possible. This unit is not shown separately, but is considered as part of the input unit 50.

Figure 3:
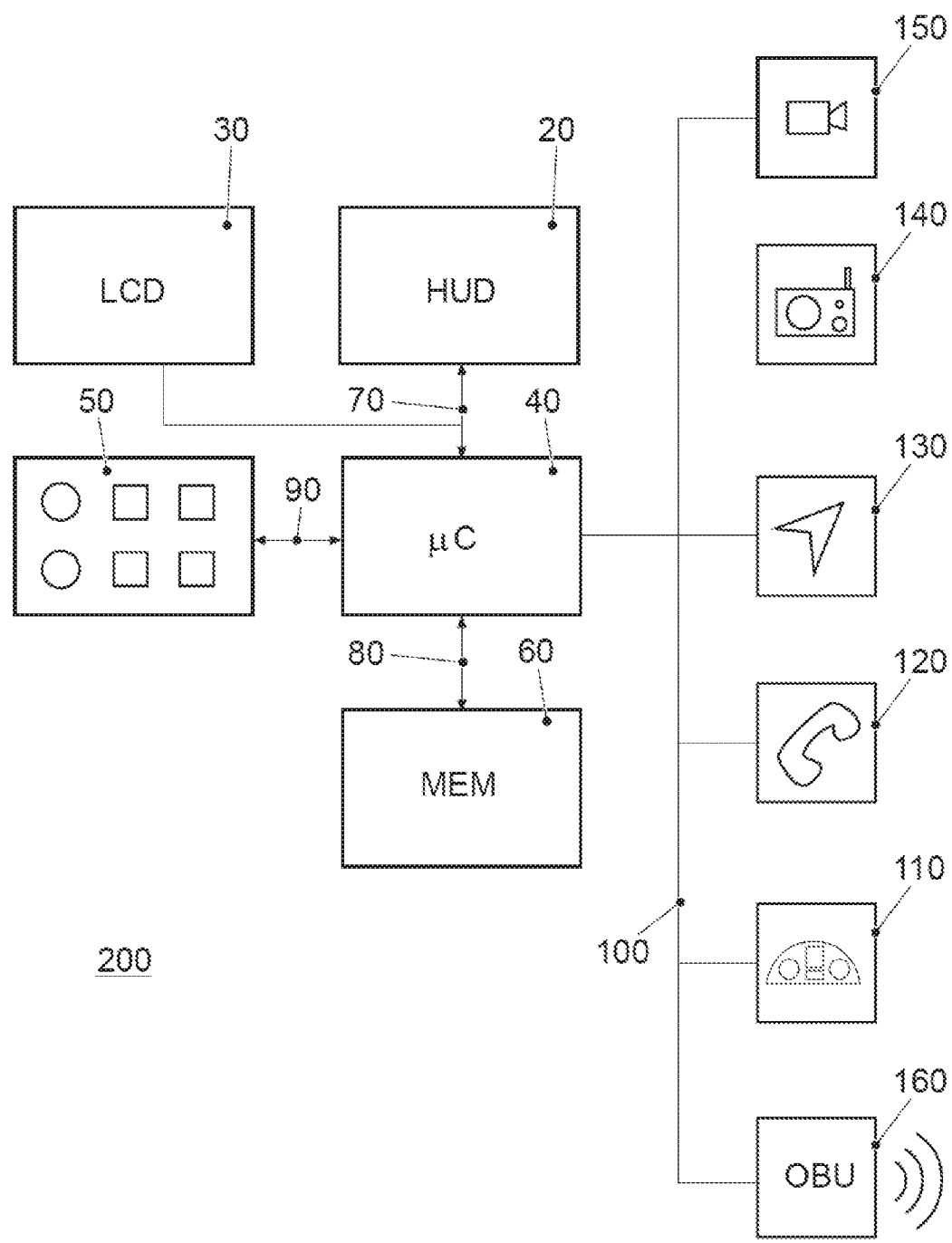
FIG. 3 shows the block wiring diagram of the infotainment system of the transportation vehicle.

FIG. 3 shows a schematic block wiring diagram of the infotainment system 200 and some examples of sub-systems or applications of the infotainment system. The control device comprises the touch-sensitive display unit 30, a processing device 40, an input unit 50 and a memory 60. The display unit 30 comprises both a display area for displaying variable graphical information, and a control surface (touch-sensitive layer) positioned above the display area for entering commands by a user.

The display device 30 is connected to the processing device 40 via a data line 70. The data line can be designed according to the LVDS standard, corresponding to Low Voltage Differential Signaling. Via the data line 70 the display unit 30 receives control data for controlling the display area of the touch screen 30 from the processing device 40. Via the data line 70, control data from the input commands are also transmitted from the touch screen 30 to the processing device 40. The reference numeral 50 designates the input unit. Associated with this are the above-mentioned controls such as buttons, rotary knobs, slider controls, or rotary pressure knobs, with which the operator can make entries via the menu navigation. The term entry is understood generally to mean calling up a selected menu option, as well as changing a parameter, switching a function on and off—etc.

The storage device 60 is connected to the processing device 40 via a data line 80. The memory 60 contains a stored catalog of icons and/or a symbol catalog with the icons and/or symbols for the possible displays of additional information. The dots/symbols which are used as a basis for the computation of the grid-display can also be stored here.

The other parts of the infotainment system, camera 150, radio 140, navigation device 130, telephone 120 and instrument cluster 110 are connected to the device for operating the infotainment system via the data bus 100. The high-speed properties of the CAN-bus in accordance with ISO standard 11898-2 is a suitable choice for the data bus 100. Alternatively, the use of a bus system based on Ethernet technology, such as BroadR-Reach, is also possible. Bus systems in which the data transmission takes place via fiber-optic cables can also be used. Examples to be cited are the MOST bus (Media Oriented System Transport) or the D2B bus (Domestic Digital Bus). It is also noted here that the camera 150 can be designed as a conventional video camera. In this case, it records up to 25 full frames/s, which in the interlaced recording mode corresponds to 50 half-frames/s. Alternatively, a special camera can be used which takes more frames/s to increase the accuracy of the object detection for faster moving objects. A plurality of cameras can be used for monitoring the surroundings. In addition, the radar or lidar systems already mentioned can be used in addition or as alternatives, to carry out or extend the monitoring of the environment. For wireless communication internally and externally, the transportation vehicle 10 is equipped with a communication module 160. This module is often referred to as an on-board unit. It can be designed for mobile radio communication, e.g., based on the LTE standard, corresponding to Long Term Evolution. It can also be designed for WLAN communication, in accordance with Wireless LAN, either for communication with devices belonging to the occupants of the transportation vehicle or for the vehicle-to-vehicle communication etc.

The disclosed method for computing a display of additional information for display on a display unit 20 will be explained in the following on the basis of an exemplary embodiment.

For the other figures, identical reference numerals designate the same fields and symbols as described in the description of FIGS. 1 to 3.

Figure 4:
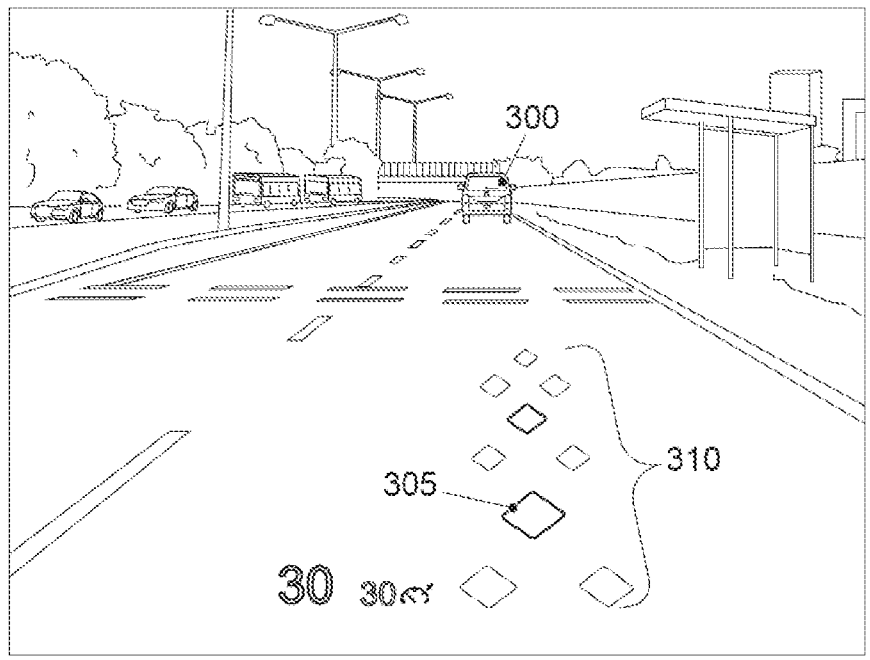
FIG. 4 shows a drawing of a first overlaid grid for displaying the phase of configuring a longitudinal guidance system to follow a transportation vehicle in front while maintaining the correct speed or distance.
Figure 5:
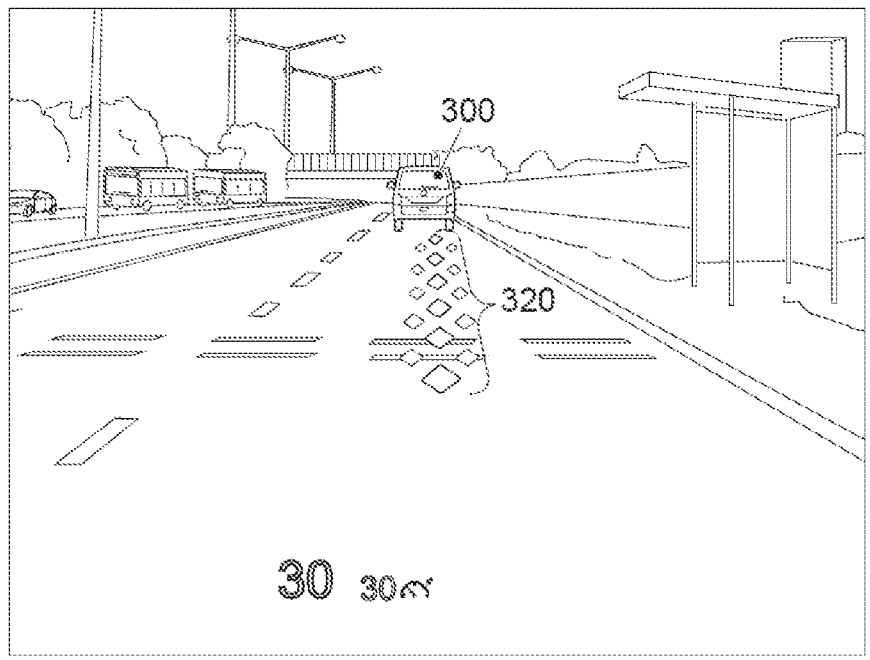
FIG. 5 shows a drawing of a second overlaid grid for displaying the phase of configuring a longitudinal guidance system for following a transportation vehicle in front while maintaining the correct speed or distance.

The basis of the disclosed display of the longitudinal guidance function of the transportation vehicle 10 on the HUD 20 is the display of a virtual grid, which is shown at a distance above the actual road or at the same level as the road. The road is positioned in the field of vision of the driver as a real road surface. The AR-display using the HUD 20 takes place as shown in FIG. 4. The grid is projected such that it is either positioned on the road or "floats in space" a distance above the road. It is shown that a grid is displayed along the road surface. This extends as far as the transportation vehicle in front. FIG. 4 shows that at the time shown, only the first section 310 of the grid is displayed. The second section 320 of the grid is then displayed at a second time, see FIG. 5. At the time at which the second section 320 is displayed, the first section 310 of the grid is already hidden again. By the successive display of sections 310, 320 of the grid, the driver of the transportation vehicle 10 experiences the impression of a "guide beam", which starts from the driver's transportation vehicle 10 and moves towards the transportation vehicle in front 300. The impression that the driver experiences could also be described as a signal issuing from the driver's own transportation vehicle 10. Similar signals can also be found on construction sites on roadways, where under guidance from "navigation lamps", for example, the route to a constriction is marked.

The division of the grid into only two sections was chosen as an example. In other disclosed embodiments, the grid 22 could be divided into further sections that are displayed sequentially. This would make the movement of the guide beam appear smoother.

In the following description, it is assumed that the driver is controlling the transportation vehicle 10 but is supported by a driver assistance system. A driver assistance system is used for the longitudinal guidance of the transportation vehicle 10. Examples of such assistance systems are an automatic distance control system ACC, corresponding to adaptive cruise control, and a speed control system GRA, corresponding to Geschwindigkeitsregelungssystem (German term for a speed control system). The disclosed embodiments could also be used in the same way if the transportation vehicle 10 were being controlled fully automatically. The following describes the operations that are taken if the transportation vehicle 10 with an activated longitudinal guidance system, here an ACC system 300, is approaching the transportation vehicle in front, detects this and adjusts its speed to that of the transportation vehicle in front 300. This is carried out in such a way that a previously entered safety distance is maintained.

Figure 6:
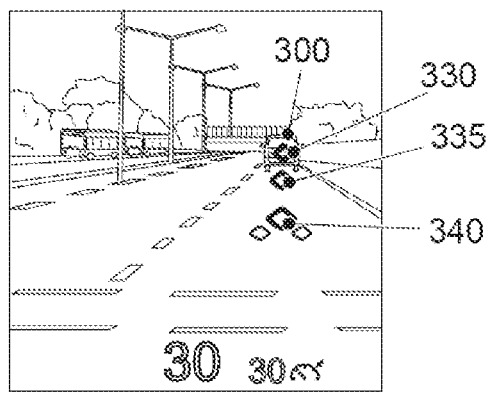
FIG. 6 shows a drawing of an AR-display for confirming to the driver that the longitudinal guidance system is active and is regulating relative to the transportation vehicle in front.
Figure 6:
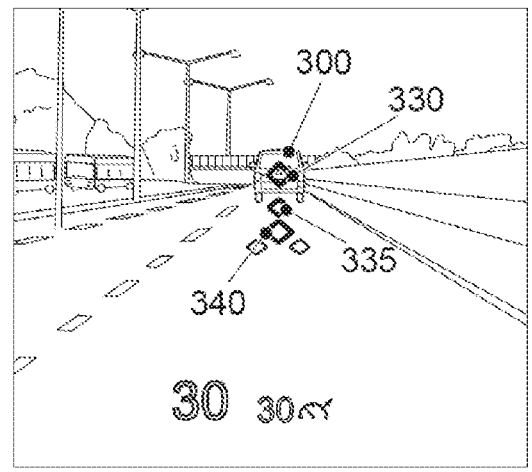

FIG. 6 shows that the longitudinal guidance system has already quit the configuration mode and has changed to a control mode. As described, the configuration mode was visualized by the guide beam display. According to the disclosed embodiments, the change from the configuration mode to the control mode is visualized as follows. The guide beam display is exited and instead, an AR-display is computed for the display of an object recognition mark. In the above example, even two object recognition marks 330 and 335 are computed. In this case, the detection mark 330 is computed in such a way that that it is displayed on the tailgate of the transportation vehicle in front 300 and the tailgate of the transportation vehicle in front 300 is marked. This signals to the driver the transportation vehicle relative to which the longitudinal guidance system is regulating the distance and/or the speed. The second detection mark 335 is placed at the end of the previously displayed grid. In the example, the two identification marks 330, 335 are diamond symbols. This approach is intended to allow the driver to understand the correct object perception, and create the necessary transparency required to build trust in the technical processes.

In addition, a second AR-display is computed for the display of a control activity mark 340, which is intended to provide information about the control activity of the longitudinal guidance system. In the example illustrated, the control activity mark 340 is formed by three diamond symbols, which are arranged differently depending on the control activity. In FIG. 6, it is shown that the transportation vehicle 10 is approaching the transportation vehicle in front 300. The instantaneous speed of the transportation vehicle in front 300 is therefore still lower than the target speed entered in the observer transportation vehicle 10, which in the case illustrated is also displayed in the field of vision of the driver and is indicated as 30 km/h. The instantaneous speed is also indicated as 30 km/h. Both speeds are displayed on the lower edge of the image. The instantaneous speed is higher than the target speed. The control activity mark 340 in FIG. 6 has the shape of a forward pointing arrow, which can also be designated as a "forwards arrow". In the right-hand image of FIG. 6 a later time is shown. At this time, the observer transportation vehicle 10 has advanced nearer to the transportation vehicle in front. This is signaled to the driver by the control activity mark 335 being displayed nearer to the transportation vehicle in front 300. In the example, the control activity mark 335 consists of three diamond symbols. If the two lateral diamond symbols are offset to the rear relative to the middle diamond symbol, the aforementioned "forwards arrow" appears.

For the visualization of the control activity, three states are provided for (as described above). If the system is accelerating or approaching a transportation vehicle in front due to a still higher set speed (reducing the distance apart), the forward pointing arrow is inserted as an AR-display. If the distance is kept constant, a line-like neutral symbol appear as an AR-display. If the distance is increased, either because a lower speed is selected by the driver or a larger desired distance has been set, this is indicated by an arrow pointing towards the driver—a "backwards arrow". In this case, the control activity mark 340 from the point of view of the driver is still located "behind" the transportation vehicle in front 300 and then travels "through" the transportation vehicle in front towards the object mark 335.

Figure 7:
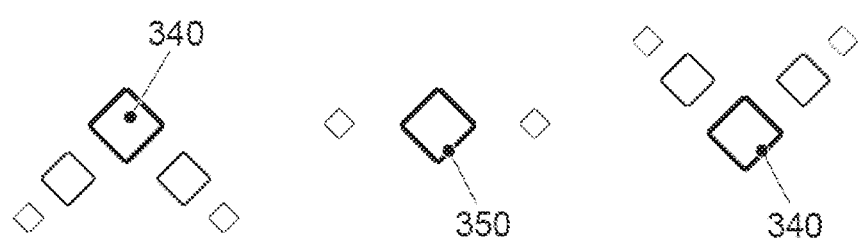
FIG. 7 shows a drawing of the three basic AR displays for the visualization of the control activity of the longitudinal guidance system.

FIG. 7 shows the above-mentioned embodiments of a control activity mark 340. The "forwards arrow" is shown in the left-hand part of the image. A corresponding "backwards arrow" is shown in the right-hand part of FIG. 7. In the case illustrated, "forwards arrow" and "backwards arrow" each consist of five diamond symbols. In the central part of the figure the neutral symbol is also shown, which is referred to in the following as a control locked-on symbol 350. It consists of only 3 diamond symbols, which are arranged in a line. The displays described above do not need to be displayed permanently, but can also be hidden or shown with significantly increased transparency.

The longitudinal guidance system continues reducing the distance to the transportation vehicle in front 300 until the safety distance from the transportation vehicle in front that is set in the system, or a calculated variable safety distance appropriate to the speed is reached. The AR-display is computed in such a way that when the central diamond of the control activity mark 340 is coincident with the recognition mark 335 displayed on the ground, the two rear diamonds of the control activity mark 340 are positioned at the front and arranged in a line at the side of the middle diamond. As soon as the central diamond ("arrowhead") covers the identification mark ("locks on"), the repositioning of the lateral diamond symbols takes place. This procedure creates a "line" behind the transportation vehicle in front 300, which follows the transportation vehicle in front 300. This AR-display conveys to the driver of the observer transportation vehicle 10 that the transportation vehicle 10 will maintain a constant distance from the transportation vehicle in front 300 from now on.

Figure 8:
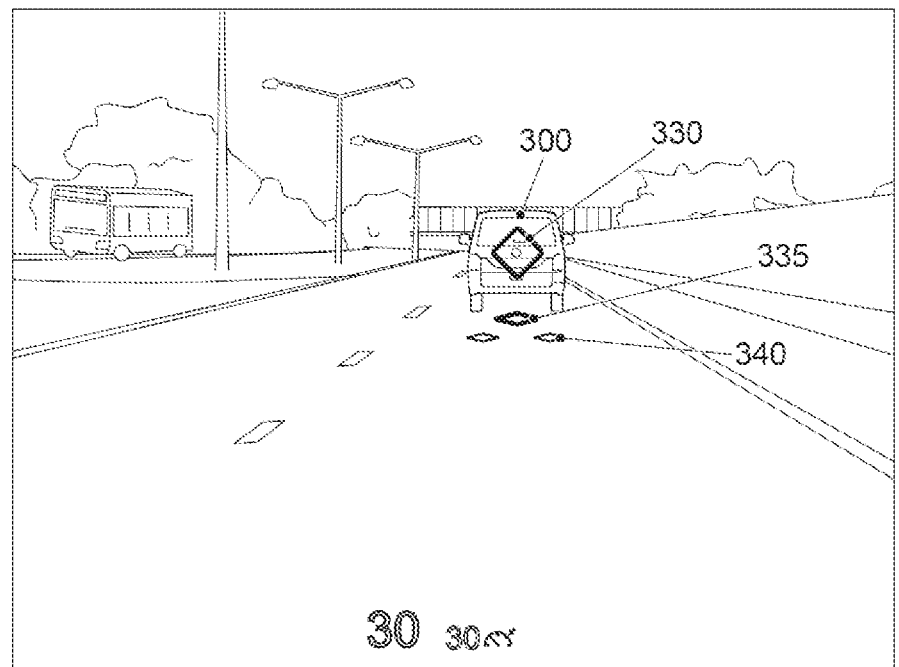
FIG. 8 shows a drawing of an AR-display for the moment shortly before the longitudinal guidance system has reached the target distance or the target speed by the control activity when following the transportation vehicle in front.
Figure 9:
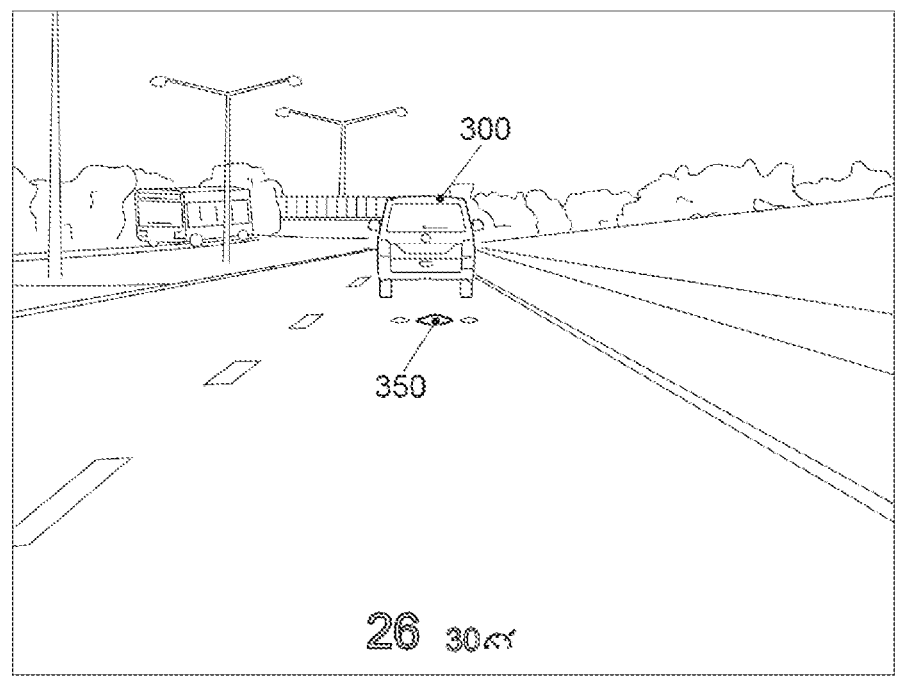
FIG. 9 shows a drawing of an AR-display for the moment at which the longitudinal guidance system has reached the target distance or the target speed by the control activity when following the transportation vehicle in front.

FIG. 8 shows the exact moment at which the control activity mark 340 reaches the object mark 335. FIG. 9 shows the moment where the forward arrow turns into a control locked-on symbol 350.

Figure 10:
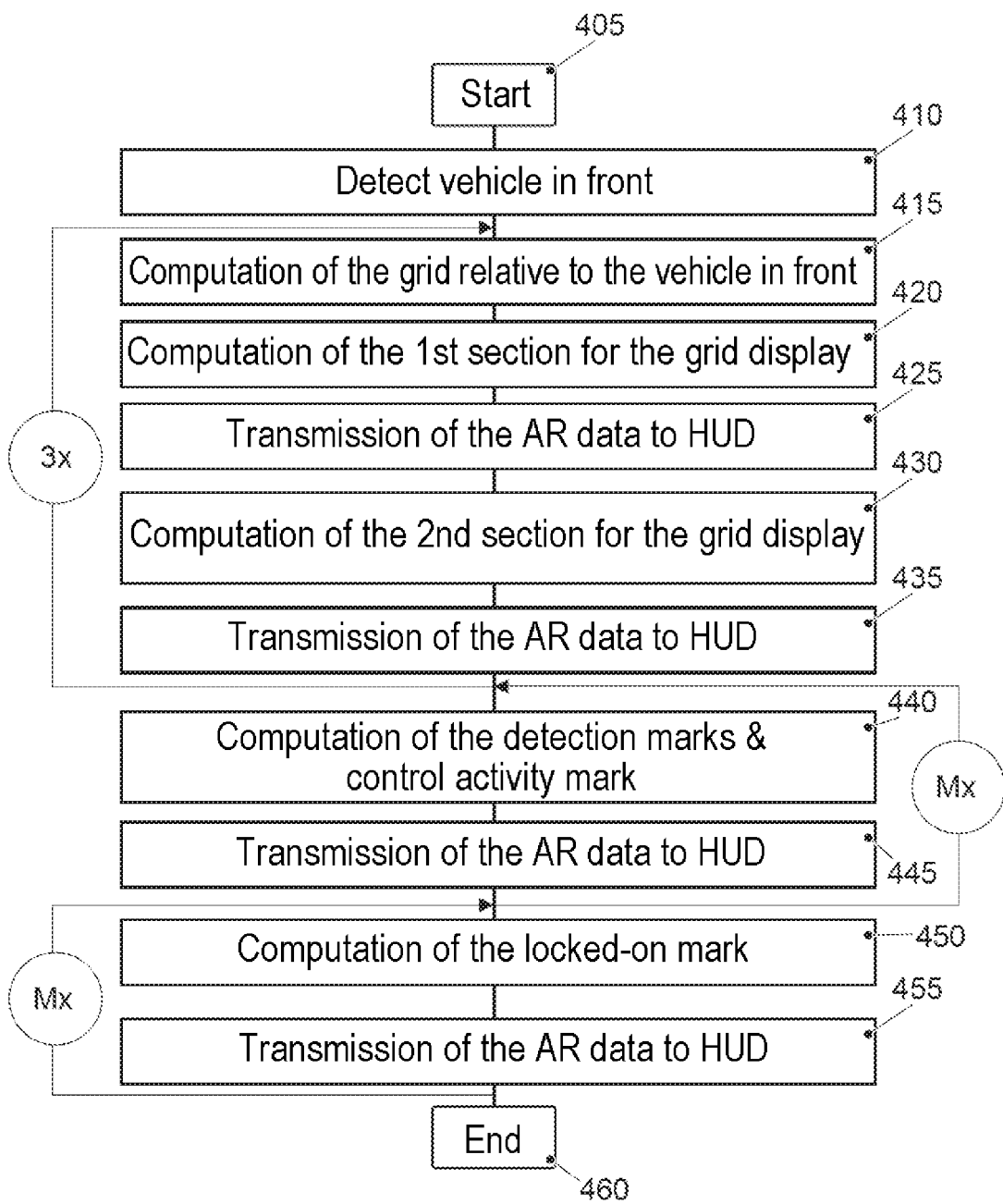
FIG. 10 shows a flowchart for a program for computing AR-displays for the display of the various phases of the configuration and the control activity of a longitudinal guidance system for following a transportation vehicle in front while maintaining the correct speed or distance.

By reference to FIG. 10 a further computer program for computing the AR-displays will be described. This program is processed in the computing unit 40. The program start is designated by the reference numeral 405. In program operation at 410 a transportation vehicle in front is detected. To this end, the images supplied by the camera 150 are analyzed with the object recognition algorithms provided for this purpose. After the transportation vehicle in front 300 has been detected, the computation of the grid for the following section-by-section AR-display is performed in program operation at 415. Optionally, the grid is computed in perspective. The computation is also carried out in such a way that the grid extends up to the transportation vehicle in front 300. Then, the extraction of the 1st section of the computed grid is carried out in operation at 420. In program operation at 425 the extracted data for the 1st section is transmitted to the head-up display 20. This performs the display of the 1st section of the grid, as shown in FIG. 4. The program operation at 430 and 435 relate to the extraction of the 2nd section of the computed grid and the transmission of the extracted data to the HUD 20. The HUD 20 will then display the 2nd section of the grid. The consecutive display of the 1st section and the 2nd section leads to the emergence of the guide beam effect, which was described earlier. A loop is now formed in the program, in which the operations at 415 to 435 are repeated 3 times. The program is then continued with program operation at 440. In this operation the computation of the object marks 330, 335 and the control activity mark 340 is performed. The computation is performed taking into account the instantaneous speed of the observer transportation vehicle 10, the instantaneous speed of the transportation vehicle in front 300 and the safety distance that was computed or set.

The instantaneous speed of the transportation vehicle in front of it can be estimated by the continuing image analysis of the images supplied by the camera 150. In another configuration, the instantaneous speed can be transmitted from the transportation vehicle in front to the observer transportation vehicle 300 via Car-2-Car communication. In operation at 445, the data calculated for the AR-display of the control activity mark 340 are transmitted to the HUD 20. Via the operations at 440 and 445 in turn, a loop is formed in the program, which is executed as often as required until a change of state occurs. The change of state occurs when the control activity mark 340 has reached the object mark 335. In other words, when the situation as shown in FIG. 8 applies. Then, in the following program operation at 450 the computation of the AR data for the control locked-on mark 350 takes place. These data are then transferred to the HUD 20 in program operation at 455. This then displays the control locked-on mark 350, as shown in FIG. 8. The program operations at 450 and 455 are then continually repeated until such time as the tracking of the transportation vehicle in front 300 persists at the set/computed distance. When this state is exited, the program is terminated in program operation at 460. If the driver intervenes and exits the comfort feature, the program can be terminated at any time.

All examples mentioned herein, as well as conditional formulations, are to be understood as being without limitation to such specifically mentioned examples. Thus, for example, it will be acknowledged by persons skilled in the art that the block diagram shown here represents a conceptual view of an exemplary circuit arrangement. In a similar way it should be recognized that any illustration of a flow chart, state transition diagram, pseudo-code and the like represents different variations for the purpose of illustrating processes which are essentially stored in computer-readable media and can therefore be executed by a computer or processor. The object referred to in the claims can explicitly also be a person.

It should be understood that the proposed method and the associated devices can be implemented in various forms of hardware, software, firmware, special processors or a combination of these. Special processors can comprise application specific integrated circuits (ASICs), Reduced Instruction Set Computers (RISC) and/or Field Programmable Gate Arrays (FPGAs). Optionally, the proposed method and the device are implemented as a combination of hardware and software. The software may be installed as an application program on a software storage device. Typically, this will be a machine based on a computer platform, which has hardware such as one or more central processing units (CPU), a random access memory (RAM) and one or more input/output (I/O) interface(s). In addition, an operating system is typically installed on the computer platform. The various processes and functions which have been described here can either be part of the application program or executed as part of the operating system.

The disclosure is not limited to the exemplary embodiments described here. There is scope for various adaptations and modifications, which the person skilled in the art due to his expertise would also consider as belonging to the disclosure.

The disclosure is described in greater detail in the exemplary embodiments based on the example of its use in transportation vehicles. Reference is also made to the possibility for use in aircraft and helicopters, for example, in landing maneuvers or search operations, etc.

It is pointed out, however, that the use is not limited to the above. The disclosed embodiments can be used wherever AR-displays can be used to augment the field of vision of a driver, an operator or even just a person wearing data glasses.

Even in remote-controlled devices such as robots, in which the remote control is performed via a monitor on which a camera image is displayed, AR displays can also simplify their operation. Thus a possible application also exists in this area.

LIST OF REFERENCE NUMERALS 10 transportation vehicle
20 head-up display HUD
21 virtual projection surface
30 touch-sensitive display unit
40 computing unit
50 input unit
60 memory unit
70 data line to the display unit
80 data line to the memory unit
90 data line to the input unit
100 data bus
110 instrument cluster
120 telephone
130 navigation device
140 radio
150 camera
160 communication module
200 infotainment system
300 transportation vehicle traveling in front
305 grid symbol
310 grid (1st section)
320 grid (2nd section)
330 1st object recognition mark
335 2nd object recognition mark
340 control activity mark
350 control locked-on mark
405—various
460 program operations

The invention claimed is:

1. A device for displaying information to an observer transportation vehicle driver using Augmented Reality (AR), the device comprising:
a display unit with which virtual additional information is inserted into a field of vision of the driver of the observer transportation vehicle;
a computing unit, wherein the observer transportation vehicle includes a detector configured to detect the environment of the transportation vehicle,
wherein the computing unit is configured to compute a position of a transportation vehicle travelling in front of the observer transportation vehicle and to compute movement of the observer vehicle relative to the transportation vehicle travelling in front, and, in response to detecting an approach to the transportation vehicle travelling in front, to compute an animated graphic, and
wherein the animated graphic is computed such that the animated graphic is displayed section by section in a periodically recurring manner starting from the observer vehicle,
wherein the device further comprises a longitudinal guidance system for distance control or speed control, and
wherein a control activity mark is computed such that during an approach to the transportation vehicle travelling in front, the control activity mark moves towards the transportation vehicle travelling in front, wherein, in response to reaching a target distance or a target speed, the control activity mark is computed such that the control activity mark reaches an end of the animated graphic at a position of the transportation vehicle travelling in front and merges with an object recognition mark, wherein at least a side portion of the control activity mark attaches itself next to the object recognition mark in a contact-analogous manner.

2. The device of claim 1, wherein the display unit is a Head-Up Display (HUD) or a pair of data glasses.

3. A motor vehicle including the device of claim 1.

4. The device of claim 1, wherein, during the first or a recurring display of the end of the animated graphic an AR-display is computed such that at least one object recognition mark is placed at the end of the vehicle travelling in front in a contact-analogous manner to the transportation vehicle travelling in front.

5. The device of claim 1, wherein an AR-display is computed in such a way that two object recognition marks are placed, wherein one object recognition mark is computed to highlight the end of the region on the ground in front of the observer transportation vehicle and the other object recognition mark highlights a tailgate of the transportation vehicle travelling in front.

6. The device of claim 1, wherein to indicate an approach towards or movement away from the transportation vehicle in front, the control activity mark is computed such that the control activity mark is displayed as an arrow pointing to the vehicle in front between the observer transportation vehicle and the transportation vehicle travelling in front during an approach to the transportation vehicle travelling in front and the mark is displayed as an arrow pointing away from the transportation vehicle travelling in front between the observer transportation vehicle and the transportation vehicle travelling in front during a movement away from the transportation vehicle travelling in front.

7. The device of claim 1, wherein the control activity mark is computed such that the control activity mark indicates the control activity of the longitudinal guidance system, wherein at least three different states are distinguished, wherein an arrow oriented in a driving direction is formed in response to the target speed of the longitudinal guidance system being greater than the current speed of the observer transportation vehicle or the distance to the transportation vehicle travelling in front is still greater than the target distance, wherein a reverse-directed arrow is formed in response to the target speed of the speed control system being lower than the current speed of the observer transportation vehicle, or the distance to the transportation vehicle travelling in front being still less than the target distance, and wherein the side portions of the control activity mark are positioned such that a line-like control locked-on mark is formed in response to the actual speed matches the target speed of the speed control system or the distance matches the target distance.

8. The device of claim 1, wherein the animated graphic is computed in the form of a grid consisting of a plurality of grid elements.

9. A method for computing an Augmented Reality (AR) display of additional information for display on a display unit, the method comprising:

displaying of additional information to support a driver of an observer transportation vehicle in longitudinal guidance of the observer transportation vehicle;

computing the display based on augmented reality in a contact-analogous manner to one or more objects in the environment of the observer transportation vehicle; and detecting a position of a vehicle traveling in front of the observer transportation vehicle, wherein, when approaching the vehicle travelling in front, an animated graphic is computed such that the animated graphic is displayed section by section in a periodically recurring manner starting from the observer transportation vehicle, and further comprising computing the control activity mark such that during an approach to the transportation vehicle travelling in front, the control activity mark moves towards the transportation vehicle travelling in front in a longitudinal guidance system for distance control or speed control, wherein, in response to reaching a target distance or a target speed, the control activity mark is computed such that the control activity mark reaches an end of the animated graphic at a position of the transportation vehicle travelling in front and merges with an object recognition mark, wherein at least a side portion of the control activity mark attaches itself next to the object recognition mark in a contact-analogous manner.

10. The method of claim 9, wherein, during the first or a recurring display of the end of the animated graphic an AR-display is computed such that at least one object recognition mark is placed at the end of the vehicle travelling in front in a contact-analogous manner to the transportation vehicle travelling in front.

11. The method of claim 9, wherein the AR-display is computed in such a way that two object recognition marks are placed, wherein one object recognition mark is computed to highlight the end of the region on the ground in front of the observer transportation vehicle and the other object recognition mark highlights a tailgate of the transportation vehicle travelling in front.

12. The method of claim 11, wherein to indicate an approach towards or movement away from the transportation vehicle in front, a control activity mark is computed such that the control activity mark is displayed as an arrow pointing to the vehicle in front between the observer transportation vehicle and the transportation vehicle travelling in front during an approach to the transportation vehicle travelling in front and the mark is displayed as an arrow pointing away from the transportation vehicle travelling in front between the observer transportation vehicle and the transportation vehicle travelling in front during a movement away from the transportation vehicle travelling in front.

13. The method of claim 9, wherein the control activity mark is computed such that the control activity mark indicates the control activity of the longitudinal guidance system, wherein at least three different states are distinguished, wherein an arrow oriented in a driving direction is formed in response to the target speed of the longitudinal guidance system being greater than the current speed of the observer transportation vehicle or the distance to the transportation vehicle travelling in front is still greater than the target distance, wherein a reverse-directed arrow is formed in response to the target speed of the speed control system being lower than the current speed of the observer transportation vehicle, or the distance to the transportation vehicle travelling in front being still less than the target distance, and wherein the side portions of the control activity mark are positioned such that a line-like control locked-on mark is formed in response to the actual speed matches the target speed of the speed control system or the distance matches the target distance.

14. The method of claim 9, wherein the animated graphic is computed in the form of a grid consisting of a plurality of grid elements.

15. The method of claim 9, wherein the display unit is a Head-Up Display (HUD) or a pair of data glasses.

16. A non-transitory computer readable medium including a computer program, which when executed in a computing unit, performs operation of a method for computing an Augmented Reality (AR) display of additional information for display on a display unit, the method comprising:

displaying of additional information to support a driver of an observer transportation vehicle in longitudinal guidance of the observer transportation vehicle;

computing the display based on augmented reality in a contact-analogous manner to one or more objects in the environment of the observer transportation vehicle;

detecting a position of a vehicle traveling in front of the observer transportation vehicle, wherein, when approaching the vehicle travelling in front, an animated graphic is computed such that the animated graphic is displayed section by section in a periodically recurring manner starting from the observer transportation vehicle; and computing the control activity mark such that during an approach to the transportation vehicle travelling in front, the control activity mark moves towards the transportation vehicle travelling in front in a longitudinal guidance system for distance control or speed control, wherein, in response to reaching a target distance or a target speed, the control activity mark is computed such that the control activity mark reaches an end of the animated graphic at a position of the transportation vehicle travelling in front and merges with an object recognition mark, wherein at least a side portion of the control activity mark attaches itself next to the object recognition mark in a contact-analogous manner.

* * * * *